United States Patent
Beals

(10) Patent No.: US 9,946,857 B2
(45) Date of Patent: Apr. 17, 2018

(54) RESTRICTED ACCESS FOR HOME AUTOMATION SYSTEM

(71) Applicant: EchoStar Technologies L.L.C., Englewood, CO (US)

(72) Inventor: William Michael Beals, Englewood, CO (US)

(73) Assignee: ECHOSTAR TECHNOLOGIES INTERNATIONAL CORPORATION, Englewood, CO (US)

(*) Notice: Subject to any disclaimer, the term of this patent is extended or adjusted under 35 U.S.C. 154(b) by 0 days.

(21) Appl. No.: 14/710,331

(22) Filed: May 12, 2015

(65) Prior Publication Data
US 2016/0335423 A1    Nov. 17, 2016

(51) Int. Cl.
*G06F 21/31* (2013.01)
*H04L 12/28* (2006.01)
(Continued)

(52) U.S. Cl.
CPC .............. *G06F 21/31* (2013.01); *G06F 21/32* (2013.01); *H04L 12/2803* (2013.01); *H04L 12/2816* (2013.01); *H04L 12/2818* (2013.01); *H04L 12/2825* (2013.01); *H04L 12/2827* (2013.01); *H04L 63/101* (2013.01)

(58) Field of Classification Search
CPC .............. H04L 12/2803; H04L 12/2825; H04L 12/2816; H04L 12/2818; H04L 12/2827; H04L 63/101; G06F 21/31; G06F 21/32
See application file for complete search history.

(56) References Cited

U.S. PATENT DOCUMENTS 4,127,966 A    12/1978    Schmidt
4,386,436 A    5/1983    Kocher et al.
(Continued)

FOREIGN PATENT DOCUMENTS

CA    2 67 988 A1    4/1998
CN    105814555 A    7/2016
(Continued)

OTHER PUBLICATIONS

R. Ravindran, T. Biswas, X. Zhang, A. Chakraborti and G. Wang, "Information-centric networking based homenet," 2013 IFIP/IEEE International Symposium on Integrated Network Management (IM 2013), Ghent, 2013, pp. 1102-1108.*
(Continued)

*Primary Examiner* — Kari Schmidt
(74) *Attorney, Agent, or Firm* — Kilpatrick Townsend & Stockton LLP

(57) ABSTRACT

Systems and methods for determining access to a home automation system may include receiving a command from a user to perform a home automation function, and determining a privilege for the user, which may be based on the location of the user. The methods may include comparing the command and the user privilege to an authorization list, where the authorization list defines system access to perform home automation functions based at least on individual commands and associated privileges. The methods may also include determining whether to allow the user access to the home automation system to perform the commanded home automation function.

14 Claims, 6 Drawing Sheets

(51) Int. Cl.
*H04L 29/06* (2006.01)
*G06F 21/32* (2013.01)

(56) References Cited

U.S. PATENT DOCUMENTS

| | | | |
|---|---|---|---|
| 4,581,606 A | 4/1986 | Mallory | |
| 4,694,607 A | 9/1987 | Ishida et al. | |
| 4,728,949 A | 3/1988 | Platte et al. | |
| 4,959,713 A | 9/1990 | Morotomi et al. | |
| 5,400,246 A | 3/1995 | Wilson et al. | |
| 5,770,896 A | 6/1998 | Nakajima | |
| 5,805,442 A | 9/1998 | Crater et al. | |
| 5,822,012 A | 10/1998 | Jeon et al. | |
| 5,886,638 A | 3/1999 | Tanguay | |
| 5,894,331 A | 4/1999 | Yang | |
| 5,926,090 A | 7/1999 | Taylor et al. | |
| 5,970,030 A | 10/1999 | Dimitri et al. | |
| 6,081,758 A | 6/2000 | Parvulescu | |
| 6,104,334 A | 8/2000 | Allport | |
| 6,107,918 A | 8/2000 | Klein et al. | |
| 6,107,935 A | 8/2000 | Comerford et al. | |
| 6,119,088 A | 9/2000 | Ciluffo | |
| 6,142,913 A | 11/2000 | Ewert | |
| 6,182,094 B1 | 1/2001 | Humpleman et al. | |
| 6,225,938 B1 | 5/2001 | Hayes et al. | |
| 6,286,764 B1 | 9/2001 | Garvey et al. | |
| 6,330,621 B1 | 12/2001 | Bakke et al. | |
| 6,337,899 B1 | 1/2002 | Alcendor et al. | |
| 6,377,858 B1 | 4/2002 | Koeppe | |
| 6,405,284 B1 | 6/2002 | Bridge | |
| 6,415,257 B1 | 7/2002 | Jungua et al. | |
| 6,502,166 B1 | 12/2002 | Cassidy | |
| 6,529,230 B1 | 3/2003 | Chong | |
| 6,543,051 B1 | 4/2003 | Manson et al. | |
| 6,553,375 B1* | 4/2003 | Huang | G06F 8/61 |
| 6,663,375 B1 | 8/2003 | Huang et al. | |
| 6,646,676 B1 | 11/2003 | DaGraca et al. | |
| 6,662,282 B2 | 12/2003 | Cochran | |
| 6,744,771 B1 | 6/2004 | Barber et al. | |
| 6,748,343 B2* | 6/2004 | Alexander | H04L 41/22 340/541 |
| 6,751,657 B1 | 6/2004 | Zothner | |
| 6,756,998 B1 | 6/2004 | Bilger | |
| 6,876,889 B1 | 4/2005 | Lortz et al. | |
| 6,891,838 B1 | 5/2005 | Petite et al. | |
| 6,931,104 B1 | 8/2005 | Foster et al. | |
| 6,976,187 B2 | 12/2005 | Arnott et al. | |
| 6,989,731 B1 | 1/2006 | Kawai et al. | |
| 7,009,528 B2 | 3/2006 | Griep | |
| 7,010,332 B1 | 3/2006 | Irvin et al. | |
| 7,088,238 B2 | 8/2006 | Karaoguz et al. | |
| 7,103,545 B2 | 9/2006 | Furuta | |
| 7,143,298 B2 | 11/2006 | Wells et al. | |
| 7,234,074 B2 | 6/2007 | Cohn et al. | |
| 7,260,538 B2 | 8/2007 | Calderone et al. | |
| 7,346,917 B2 | 3/2008 | Gatto et al. | |
| 7,372,370 B2 | 5/2008 | Stults et al. | |
| 7,386,666 B1 | 6/2008 | Beauchamp et al. | |
| 7,391,319 B1 | 6/2008 | Walker | |
| 7,395,369 B2 | 7/2008 | Sepez et al. | |
| 7,395,546 B1 | 7/2008 | Asmussen | |
| 7,529,677 B1 | 5/2009 | Wittenberg | |
| 7,574,494 B1 | 8/2009 | Mayernick et al. | |
| 7,579,945 B1 | 8/2009 | Richter et al. | |
| 7,590,703 B2 | 9/2009 | Cashman et al. | |
| 7,640,351 B2 | 12/2009 | Reckamp et al. | |
| 7,659,814 B2 | 2/2010 | Chen et al. | |
| 7,694,005 B2 | 4/2010 | Reckamp et al. | |
| 7,739,718 B1 | 6/2010 | Young et al. | |
| 7,861,034 B2 | 12/2010 | Yamamoto et al. | |
| 7,870,232 B2 | 1/2011 | Reckamp et al. | |
| 7,945,297 B2 | 5/2011 | Philipp | |
| 7,969,318 B2 | 6/2011 | White et al. | |
| 8,013,730 B2 | 9/2011 | Oh et al. | |
| 8,042,048 B2 | 10/2011 | Wilson et al. | |
| 8,086,757 B2 | 12/2011 | Chang | |
| 8,106,768 B2 | 1/2012 | Neumann | |
| 8,156,368 B2 | 4/2012 | Chambliss et al. | |
| 8,171,148 B2 | 4/2012 | Lucas et al. | |
| 8,180,735 B2 | 5/2012 | Ansari et al. | |
| 8,201,261 B2 | 6/2012 | Barfield et al. | |
| 8,221,290 B2 | 7/2012 | Vincent et al. | |
| 8,275,143 B2 | 9/2012 | Johnson | |
| 8,289,157 B2 | 10/2012 | Patenaude et al. | |
| 8,290,545 B2 | 10/2012 | Terlizzi | |
| 8,310,335 B2 | 11/2012 | Sivakkolundhu | |
| 8,316,413 B2 | 11/2012 | Crabtree | |
| 8,320,578 B2 | 11/2012 | Kahn et al. | |
| 8,335,312 B2 | 12/2012 | Gerhardt et al. | |
| 8,413,204 B2 | 4/2013 | White et al. | |
| 8,436,902 B2 | 5/2013 | Kuehnle | |
| 8,498,572 B1 | 7/2013 | Schooley et al. | |
| 8,516,087 B2 | 8/2013 | Wilson et al. | |
| 8,539,567 B1* | 9/2013 | Logue | H04L 63/0884 709/223 |
| 8,550,368 B2 | 10/2013 | Butler et al. | |
| 8,619,136 B2 | 12/2013 | Howarter et al. | |
| 8,620,841 B1 | 12/2013 | Filson et al. | |
| 8,644,525 B2 | 2/2014 | Bathurst et al. | |
| 8,645,327 B2 | 2/2014 | Falkenburg et al. | |
| 8,667,529 B2 | 3/2014 | Taxier | |
| 8,750,576 B2* | 6/2014 | Huang | G06F 21/32 382/117 |
| 8,780,201 B1* | 7/2014 | Scalisi | H04N 7/186 348/143 |
| 8,786,698 B2 | 7/2014 | Chen et al. | |
| 8,799,413 B2 | 8/2014 | Taylor et al. | |
| 8,818,898 B2 | 8/2014 | Schlossberg et al. | |
| 8,898,709 B2 | 11/2014 | Crabtree | |
| 8,923,823 B1 | 12/2014 | Wilde | |
| 8,930,700 B2 | 1/2015 | Wielopolski | |
| 8,948,793 B1 | 2/2015 | Birkhold et al. | |
| 8,965,170 B1 | 2/2015 | Benea et al. | |
| 9,019,111 B1 | 4/2015 | Sloo et al. | |
| 9,049,567 B2 | 6/2015 | Le Guen et al. | |
| 9,191,804 B1 | 11/2015 | Paczkowski et al. | |
| 9,237,141 B2* | 1/2016 | Logue | H04L 63/0884 |
| 9,246,921 B1* | 1/2016 | Vlaminck | H04L 63/10 |
| 9,258,593 B1 | 2/2016 | Chen et al. | |
| 9,443,142 B2 | 9/2016 | Reynolds, Jr. | |
| 9,462,041 B1* | 10/2016 | Hagins | H04L 67/10 |
| 9,495,860 B2 | 11/2016 | Lett | |
| 9,511,259 B2 | 12/2016 | Mountain | |
| 9,599,981 B2 | 3/2017 | Crabtree | |
| 9,621,959 B2 | 4/2017 | Mountain | |
| 9,628,286 B1 | 4/2017 | Nguyen et al. | |
| 9,632,746 B2 | 4/2017 | Keipert et al. | |
| 9,633,186 B2* | 4/2017 | Ingrassia, Jr. | G06F 21/32 |
| 9,729,005 B2 | 8/2017 | Marten | |
| 2001/0012998 A1 | 8/2001 | Jouet et al. | |
| 2002/0003493 A1 | 1/2002 | Durst et al. | |
| 2002/0019725 A1 | 2/2002 | Petite | |
| 2002/0063633 A1 | 5/2002 | Park | |
| 2002/0080238 A1 | 6/2002 | Ohmura | |
| 2002/0193989 A1 | 12/2002 | Geilhufe et al. | |
| 2003/0005431 A1 | 1/2003 | Shinohara | |
| 2003/0052789 A1 | 3/2003 | Colmenarez et al. | |
| 2003/0097452 A1 | 5/2003 | Kim et al. | |
| 2003/0126593 A1 | 7/2003 | Mault | |
| 2003/0133551 A1 | 7/2003 | Kahn | |
| 2003/0140352 A1 | 7/2003 | Kim | |
| 2003/0201900 A1 | 10/2003 | Bachinski et al. | |
| 2004/0019489 A1 | 1/2004 | Funk et al. | |
| 2004/0036579 A1 | 2/2004 | Megerle | |
| 2004/0117038 A1 | 6/2004 | Karaoguz et al. | |
| 2004/0117843 A1 | 6/2004 | Karaoguz et al. | |
| 2004/0121725 A1* | 6/2004 | Matsui | G08C 17/02 455/3.06 |
| 2004/0128034 A1 | 7/2004 | Lenker et al. | |
| 2004/0143838 A1 | 7/2004 | Rose | |
| 2004/0148419 A1 | 7/2004 | Chen et al. | |
| 2004/0148632 A1 | 7/2004 | Park et al. | |
| 2004/0260407 A1 | 12/2004 | Wimsatt | |
| 2004/0266419 A1 | 12/2004 | Arling et al. | |

(56) References Cited

U.S. PATENT DOCUMENTS

| | | |
|---|---|---|
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1* | 8/2005 | Campbell ............... G06F 21/32 715/742 |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0192680 A1 | 8/2006 | Scuka et al. |
| 2006/0244624 A1 | 11/2006 | Wang et al. |
| 2006/0253894 A1* | 11/2006 | Bookman ............ H04L 63/0428 726/2 |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0066507 A1* | 3/2010 | Myllymaki ............ G06F 21/31 340/10.4 |
| 2010/0083371 A1 | 4/2010 | Bennetts et al. |
| 2010/0097225 A1* | 4/2010 | Petricoin, Jr. ....... G07C 9/00111 340/573.1 |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0164732 A1 | 7/2010 | Wedig et al. |
| 2010/0211546 A1 | 8/2010 | Grohman et al. |
| 2010/0283579 A1* | 11/2010 | Kraus ................. G07C 9/00944 340/5.7 |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1* | 6/2012 | Dodeja ................. H04W 12/08 455/410 |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0179926 A1* | 7/2013 | White ................. H04L 12/2809 725/59 |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0247117 A1 | 9/2013 | Yamada et al. |

(56) References Cited

U.S. PATENT DOCUMENTS

| | | |
|---|---|---|
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1* | 3/2014 | Logue .............. H04L 63/0884 713/182 |
| 2014/0095684 A1 | 4/2014 | Nonaka et al. |
| 2014/0101465 A1 | 4/2014 | Wang et al. |
| 2014/0129006 A1* | 5/2014 | Chen .............. G05B 15/02 700/90 |
| 2014/0135993 A1 | 5/2014 | Kang et al. |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1* | 7/2014 | Hanko .............. H04L 12/2829 348/156 |
| 2014/0192997 A1 | 7/2014 | Niu et al. |
| 2014/0201315 A1* | 7/2014 | Jacob .............. H04L 12/2803 709/217 |
| 2014/0215505 A1 | 7/2014 | Balasubramanian et al. |
| 2014/0218517 A1* | 8/2014 | Kim .............. H04L 12/2818 348/143 |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0310075 A1 | 10/2014 | Ricci |
| 2014/0313014 A1 | 10/2014 | Huh et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0062343 A1* | 3/2015 | Hwang .............. B60R 25/102 348/148 |
| 2015/0066173 A1 | 3/2015 | Ellis et al. |
| 2015/0074259 A1 | 3/2015 | Ansari et al. |
| 2015/0082225 A1* | 3/2015 | Shearer .............. G06F 3/0482 715/771 |
| 2015/0084770 A1 | 3/2015 | Xiao et al. |
| 2015/0085184 A1 | 3/2015 | Vidal et al. |
| 2015/0097689 A1* | 4/2015 | Logue .............. G08B 25/10 340/632 |
| 2015/0100167 A1 | 4/2015 | Sloo et al. |
| 2015/0106866 A1 | 4/2015 | Fujita |
| 2015/0113571 A1 | 4/2015 | Cholas et al. |
| 2015/0127712 A1 | 5/2015 | Fadell et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemaulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1* | 6/2015 | Jacob .............. H04L 12/2803 709/224 |
| 2015/0192914 A1 | 7/2015 | Slupik |
| 2015/0198941 A1 | 7/2015 | Pederson |
| 2015/0241860 A1 | 8/2015 | Raid |
| 2015/0281824 A1 | 10/2015 | Nguyen et al. |
| 2015/0309487 A1* | 10/2015 | Lyman .............. H04L 12/2827 700/275 |
| 2015/0325096 A1 | 11/2015 | Hatch |
| 2015/0341599 A1 | 11/2015 | Carey |
| 2015/0347910 A1 | 12/2015 | Fadell et al. |
| 2015/0365787 A1* | 12/2015 | Farrell .............. H04W 4/08 455/456.1 |
| 2016/0029153 A1 | 1/2016 | Linn et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1* | 4/2016 | Lonn .............. H04L 12/2803 700/275 |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0191912 A1 | 6/2016 | Lea et al. |
| 2016/0191990 A1 | 6/2016 | McCarthy |
| 2016/0203700 A1 | 7/2016 | Bruhn et al. |
| 2016/0234034 A1 | 8/2016 | Mahar et al. |
| 2016/0248598 A1* | 8/2016 | Lin .............. H04L 12/2803 |
| 2016/0256485 A1 | 9/2016 | Wager et al. |
| 2016/0260135 A1 | 9/2016 | Zomet et al. |
| 2016/0286327 A1 | 9/2016 | Marten |
| 2016/0323548 A1* | 11/2016 | Khot .............. G06F 3/04842 |
| 2016/0334811 A1 | 11/2016 | Marten |
| 2016/0338179 A1 | 11/2016 | Aliakseyeu et al. |
| 2016/0342379 A1 | 11/2016 | Keipert et al. |
| 2016/0366746 A1 | 12/2016 | van de Ven et al. |
| 2017/0005822 A1 | 1/2017 | Gao |
| 2017/0041886 A1 | 2/2017 | Baker et al. |
| 2017/0048476 A1 | 2/2017 | Freiin von Kapri et al. |
| 2017/0054615 A1 | 2/2017 | Wilson |
| 2017/0065433 A1 | 3/2017 | Singh et al. |
| 2017/0127124 A9 | 5/2017 | Wilson et al. |
| 2017/0146964 A1 | 5/2017 | Beals |
| 2017/0168469 A1 | 6/2017 | Marten et al. |
| 2017/0176961 A1 | 6/2017 | Tirpak |
| 2017/0187993 A1 | 6/2017 | Martch et al. |
| 2017/0191693 A1 | 7/2017 | Bruhn et al. |
| 2017/0191695 A1 | 7/2017 | Bruhn et al. |
| 2017/0195130 A1 | 7/2017 | Landow et al. |

FOREIGN PATENT DOCUMENTS

| | | |
|---|---|---|
| EP | 2 273 027 A1 | 5/2014 |
| EP | 3 080 677 A1 | 10/2016 |
| EP | 3 080 710 A1 | 10/2016 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2014/068556 A1 | 5/2014 |
| WO | 2015/179120 A1 | 11/2015 |
| WO | 2016/034880 A1 | 3/2016 |
| WO | 2016/066399 A1 | 5/2016 |
| WO | 2016/066442 A1 | 5/2016 |

(56) References Cited

FOREIGN PATENT DOCUMENTS

| WO | 2016/182696 A1 | 11/2016 |
|---|---|---|
| WO | 2017/116533 A1 | 7/2017 |

OTHER PUBLICATIONS

Mantoro, Teddy, and Elbara E. Elnour. "Web-enabled smart home using wireless node infrastructure." Proceedings of the 9th International Conference on Advances in Mobile Computing and Multimedia. ACM, 2011, pp. 72-79.*
ShariqSuhail, Md, et al. "Multi-functional secured smart home." Advances in Computing, Communications and Informatics (ICACCI), 2016 International Conference on. IEEE, 2016, pp. 2629-2634.*
U.S. Appl. No. 14/485,188, filed Sep. 12, 2014, Pre-Interview First Office Action dated Jul. 29, 2015, 20 pages.
U.S. Appl. No. 14/485,188, filed Sep. 12, 2014, Pre-Interview First Office Action dated Oct. 1, 2015, 10 pages.
International Search Report and Written Opinion for PCT/EP2015/073299 dated Jan. 4, 2016, 12 pages.
International Search Report and Written Opinion for PCT/EP2015/073936 dated Feb. 4, 2016, all pages.
U.S. Appl. No. 14/107,132, filed Dec. 16, 2013, Final Rejection dated Dec. 16, 2015, 32 pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.
U.S. Appl. No. 14/470,352, filed Aug. 27, 2014 Final Office Action dated Mar. 17, 2016, all pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
Mexican Institute of Industrial Property Office Action dated Nov. 1, 2013, for Mex. Patent Appln No. MX/a/2012/008882 is not translated into English, 3 pages.
Mexican Institute of Industrial Property Notice of Allowance dated Feb. 10, 2014, for Mex. Patent Appln No. MX/a/2012/008882, 1 page.
International Search Report and Written Opinion for PCT/EP2011/051608 dated May 30, 2011, 13 pages.
International Preliminary Report on Patentability for PCT/EP2011/051608 dated Aug. 16, 2012, 8 pages.
International Search Report and Written Opinion for PCT/US2014/053876 dated Nov. 26, 2014, 8 pages.
International Search Report and Written Opinion for PCT/US2014/055441 dated Dec. 4, 2014, 10 pages.
International Search Report and Written Opinion for PCT/US2014/055476 dated Dec. 30, 2014, 10 pages.
U.S. Appl. No. 12/700,310, filed Feb. 4, 2010 Office Action dated May 4, 2012, 15 pages.
U.S. Appl. No. 12/700,310, filed Feb. 4, 2010 Final Office Action dated Oct. 10, 2012, 16 pages.
U.S. Appl. No. 12/700,310, filed Feb. 4, 2010 Non-Final Office Action dated Apr. 1, 2013, 16 pages.
U.S. Appl. No. 12/700,310, filed Feb. 4, 2010 Non-Final Office Action dated Oct. 15, 2013, 15 pages.
U.S. Appl. No. 12/700,310, filed Feb. 4, 2010 Final Office Action dated Feb. 28, 2014, 17 pages.
U.S. Appl. No. 12/700,310, filed Feb. 4, 2010 Non-Final Office Action dated Aug. 14, 2014, 18 pages.
U.S. Appl. No. 12/700,310, filed Feb. 4, 2010 Non-Final Office Action dated Mar. 11, 2015, 35 pages.
U.S. Appl. No. 12/700,408, filed Feb. 4, 2010 Notice of Allowance dated Jul. 28, 2012, 8 pages.
U.S. Appl. No. 13/680,934, filed Nov. 19, 2012 Non-Final Office Action dated Oct. 2, 2013, 7 pages.
U.S. Appl. No. 13/680,934, filed Nov. 19, 2012 Final Office Action dated Feb. 10, 2014, 13 pages.
U.S. Appl. No. 13/680,934, filed Nov. 19, 2012 Notice of Allowance dated Apr. 30, 2014, 9 pages.
U.S. Appl. No. 13/680,934, filed Nov. 19, 2012 Notice of Allowance dated Jul. 25, 2014, 12 pages.
U.S. Appl. No. 14/107,132, filed Dec. 16, 2013 Non Final Office Action dated May 27, 2015, 26 pages.
"Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
Author Unknown, "App for Samsung Smart TV®," Crestron Electronics, Inc., accessed on Jul. 14, 2014, 3 pages. Retrieved from http://www.crestron.com/products/smart tv television apps/.
Author Unknown, "AllJoyn Onboarding Service Frameworks," Qualcomm Connected Experiences, Inc., accessed on Jul. 15, 2014, 9 pages. Retrieved from https://www.alljoyn.org.
"Do you want to know how to find water leaks? Use a Bravedo Water Alert Flow Monitor to find out!", Bravedo.com, accessed Dec. 16, 2014, 10 pages. Retrieved from http://bravedo.com/.
"Flow Pulse®, Non-invasive clamp-on flow monitor for pipes," Pulsar Process Measurement Ltd, accessed on Dec. 16, 2014, 2 pages. Retrieved from http://www.pulsar-pm.com/product-types/flow/flow-pulse.aspx.
"International Building Code Excerpts, Updated with recent code changes that impact electromagnetic locks," Securitron, Assa Abloy, IBC/IFC 2007 Supplement and 2009, "Finally-some relief and clarification", 2 pages.Retrieved from: www.securitron.com/Other/.../New_IBC-IFC_Code_Language.pdf.
"Introduction to Ultrasonic Doppler Flowmeters," Omega Engineering inc., accessed on Dec. 16, 2014, 3 pages. Retrieved from http://www.omega.com/prodinfo/ultrasonicflowmeters.html.
Lamonica, M., "CES 2010 Preview: Green comes in many colors," retrieved from CNET.com (http://ces.cnet.com/8301-31045_1-10420381-269.html), Dec. 22, 2009, 2 pages.
Robbins, Gordon, Deputy Chief, "Addison Fire Department Access Control Installation," 2006 International Fire Code, Section 1008.1.3.4, 4 pages.
"Ultrasonic Flow Meters," RS Hydro Ltd, accessed on Dec. 16, 2014, 3 pages. Retrieved from http://www.rshydro.co.uk/ultrasonic-flowmeter.shtml.
Wang et al., "Mixed Sound Event Verification on Wireless Sensor Network for Home Automation," IEEE Transactions on Industrial Informatics, vol. 10, No. 1, Feb. 2014, 10 pages.
U.S. Appl. No. 14/470,352, filed Aug. 27, 2014 Non Final Office Action dated Nov. 20, 2015, 28 pages.
U.S. Appl. No. 12/700,310, filed Feb. 4, 2010 Final Office Action dated Oct. 26, 2015, 19 pages.
Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
International Search Report and Written Opinion for PCT/EP2015/070286 dated Nov. 5, 2015, 13 pages.
International Search Report and Written Opinion for PCT/GB2015/052544 dated Oct. 6, 2015, 10 pages.
International Search Report and Written Opinion for PCT/GB2015/052457 dated Nov. 13, 2015, 11 pages.
International Search Report and Written Opinion for PCT/US2016/028126 dated Jun. 3, 2016, all pages.

(56) References Cited

OTHER PUBLICATIONS

U.S. Appl. No. 12/700,310, filed Feb. 4, 2010 Non-Final Office Action dated Jun. 16, 2016, 30 pages.
U.S. Appl. No. 14/485,188, filed Sep. 12, 2014, Non-Final Rejection dated Jun. 17, 2016, 29 pages.
International Preliminary Report on Patentability for PCT/US2014/053876 dated Jun. 14, 2016, 7 pages.
International Preliminary Report on Patentability for PCT/US2014/055441 dated Jun. 14, 2016, 8 pages.
U.S. Appl. No. 14/470,352, filed Aug. 27, 2014 Non Final Office Action dated Aug. 26, 2016, all pages.
International Preliminary Report on Patentability for PCT/US2014/055476 dated Jun. 14, 2016, 9 pages.
U.S. Appl. No. 14/528,739, filed Oct. 30, 2014 Notice of Allowance dated Jun. 23, 2016, 34 pages.
U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 12/700,310, filed Feb. 4, 2010 Notice of Allowance dated Nov. 8, 2016, all pages.
U.S. Appl. No. 14/567,765, filed Dec. 11, 2014, First Action interview dated Oct. 18, 2016, all pages.
U.S. Appl. No. 14/584,075, filed Dec. 29, 2014, Final Rejection dated Oct. 6, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/107,132, filed Dec. 16, 2013, Notice of Allowance dated Jan. 18, 2017, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
Office Action for EP14868928.4 dated Sep. 23, 2016, all pages.
Notification of Publication of European Application No. 162004220 as EP 3166308 dated May 10, 2017, 2 pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
International Preliminary Report on Patentability for PCT/GB2015/052544 dated Mar. 7, 2017, all pages.
International Search Report and Written Opinion for PCT/US2016/057729 dated Mar. 28, 2017, all pages.
European Search Report for EP 16 20 0422 dated Jan. 13, 2017, all pages.
BDEJONG_CREE, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 14/565,853, filed Dec. 10, 2014, Non Final Rejection dated Mar. 10, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 14/485,188, filed Sep. 12, 2014, Non-Final Rejection dated Apr. 19, 2017, all pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/709,791, filed May 12, 2015, Non Final Rejection dated May 31, 2017, all pages.

* cited by examiner

| COMMAND | PRIVILEGE | USER | TIME | LOCATION |
|---|---|---|---|---|
| Front Door Unlock | Level 2 | All | Day | All |
| Front Door Unlock | Level 2 | All | 10:00 PM | Inside |
| Front Door Lock | Level 3 | All | All | All |
| Bed 1 Balc. Door Unlock | Level 2 | Dad, Mom | All | All |
| . | . | . | . | . |
| . | . | . | . | . |
| . | . | . | . | . |
| Change Authorization | Level 1 | Mom | All | Inside |
| . | . | . | . | . |
| . | . | . | . | . |
| Heating Zone 1 On | Level 2 | Sister | All | All |

FIG. 5

RESTRICTED ACCESS FOR HOME AUTOMATION SYSTEM

TECHNICAL FIELD

The present technology relates to systems and methods for utilizing a home automation system. More specifically, the present technology relates to providing or denying access for security commands to a home automation system.

BACKGROUND

Home automation systems provide a plethora of valuable benefits. From monitoring ongoing activities to securing the home, these systems can be configured to monitor many activities, and can be operated by any number of users both in the home and away. While providing convenient access to the system, such flexibility may produce security issues as well. For example, a user whose phone is stolen may then have concerns about the integrity of their home.

Thus, there is a need for improved methods and systems for authorizing users to provide home automation system commands. These and other needs are addressed by the present technology.

SUMMARY

Systems and methods for determining access to a home automation system may include receiving a command from a user to perform a home automation function, and determining a privilege for the user. The methods may include comparing the command and the user privilege to an authorization list, where the authorization list defines system access to perform home automation functions based at least on individual commands and associated privileges. The methods may also include determining whether to allow the user access to the home automation system to perform the commanded home automation function. The methods may also include determining whether the command comprises a security function for the home automation system. Determining a privilege for the user may include determining an identity of the user, and determining the identity of the user may include receiving an appropriate user access code. In embodiments determining a privilege for the user may include determining a location of the user, and determining a location of the user may include determining whether the user is in the home. Being in the home may include a determination that the command was received at a central operation device, at an internal controller, or on an internal network in embodiments. Additionally, a determination that the user is on an internal network may provide access to a more limited set of commands on the authorization list than a determination that the user is at a central operation device.

The operation of determining a privilege may identify that the user is not in the home, and the comparison operation may determine that the command requires the user to be in the home. Thus, in response to the comparison, access may not be allowed to the home automation system. In embodiments the authorization list may include all available home automation system commands, and may define access for performing each command based on a privilege associated with the device from which the command is received. The available home automation system commands may further include commands having directionality, where one direction of at least one command includes access by any user with any privilege, and where another direction of the at least one command includes access restricted to a subset of users or privileges. The authorization list may still further define access by time of day, and during at least one time of day, access to any security functions may be restricted to a user determined to be in the home. Additionally, in embodiments the command received may include a physical command, and the determination of privilege may include a determination of whether the command is received from inside the home.

The present technology also includes electronic devices for use in home automation systems. The devices may include a first input component configured to receive broadcasted multimedia content, a second input component configured to receive user commands, and at least one output component communicatively coupled with at least one display device. The electronic devices may include one or more processors, and memory communicatively coupled with and readable by the one or more processors and having stored thereon processor-readable instructions, which when executed by the one or more processors cause the one or more processors to perform functions. The functions performed may include receiving a command from a user to perform a home automation function, determining a privilege for the user, and comparing the command and the user privilege to an authorization list. The authorization list may define system access to perform home automation functions based at least on individual commands and associated privileges. The functions performed may also include determining whether to allow the user access to the home automation system to perform the commanded home automation function. In embodiments, the electronic device may be or include a television receiver. The electronic device may further include a remote control specific to the device, and access to the authorization list may be available only by an access code received at the electronic device via the remote control. Additionally, determining a privilege for the user may include determining a location of the user in embodiments.

The present technology may still further include computer-readable media having stored thereon processor-readable instructions, which when executed by the one or more processors cause the one or more processors to receive a command from a user to perform a home automation function. The processors may be further caused to determine a privilege for the user, and compare the command and the user privilege to an authorization list. The authorization list may define system access to perform home automation functions based at least on individual commands and associated privileges. The processors may also be caused to determine whether to allow the user access to the home automation system to perform the commanded home automation function. In embodiments, determining a privilege for the user may include determining a location of the user. Also in embodiments, determining a location of the user may include determining whether the user is in the home, and being in the home may include a determination that the command was received at a central operation device, at an internal controller, or on an internal network.

Such technology may provide numerous benefits over conventional techniques. For example, the technology may allow enhanced security when all users are in the home. Additionally, the technology may provide peace of mind when away from the home in the knowledge that losing an access device may not compromise home security. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

FIG. 5 illustrates an exemplary authorization list according to embodiments of the present technology.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

A television receiver may serve as a host for a home automation system. By using a television receiver to host a home automation system, various advantages may be realized. For instance, the home automation system may be able to conveniently present home automation information to a user via a connected display device, such as a television or other connected devices, such as a tablet computer, mobile phone, monitor, or laptop computer. Such devices may also be used to provide commands to the home automation system including locking and unlocking windows and doors, arming systems, turning devices on and off, etc. As will be explained below, the present technology allows the system to determine whether a user providing a system command is authorized to provide the command, in order to provide enhanced security for the system. After describing home automation systems and electronic devices in FIGS. 1 and 2, which may be utilized in the present technology, methods and systems will be explained with the remaining figures.

Figure 1:
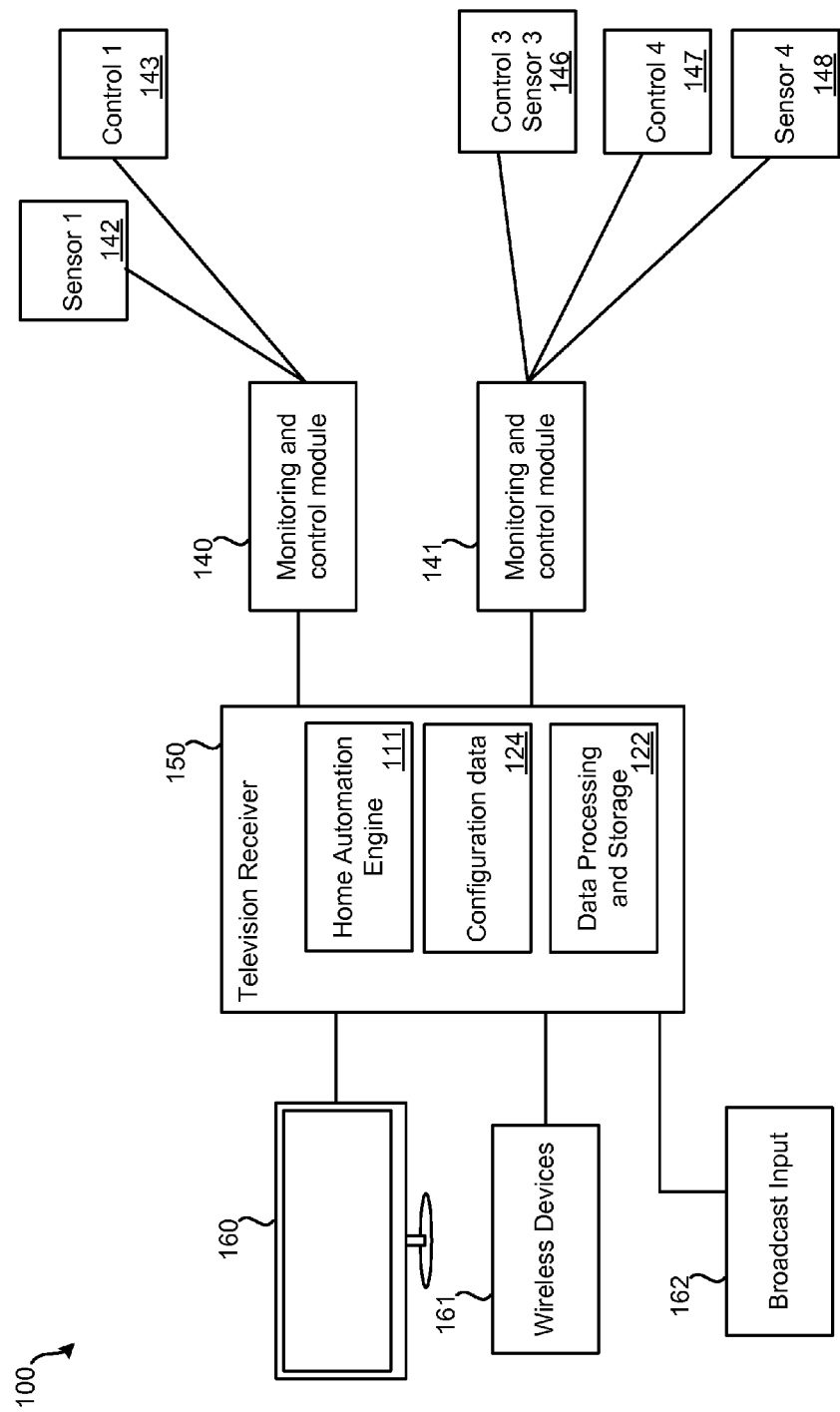
FIG. 1 illustrates an exemplary home automation setup in accordance with embodiments of the present technology.

FIG. 1 shows an embodiment of a system for home monitoring and control that includes a television receiver 150. The system 100 may include a television receiver that is directly or indirectly coupled to one or more display devices 160 such as a television or a monitor. Television receiver 150 may be configured to receive television programming from a satellite-based television service provider; in other embodiments, other forms of television service provider networks may be used, such as an IP-based network (e.g., fiber network), a cable based network, a wireless broadcast-based network, etc. Television receiver 150 may be configured to function as a host for a home automation system either alone or in conjunction with a communication device. Television receiver 150 may be in the form of a separate device configured to be connected with a display device, such as a television. Embodiments of television receiver 150 can include set-top boxes (STBs). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television. The television receiver may be communicatively coupled to other display and notification devices or wireless devices 161 such as stereo systems, speakers, lights, mobile phones, tablets, and the like. The television receiver may be configured to receive readings from one or more sensors 142, 148, or sensor systems 146 and may be configured to provide signals for controlling one or more control units 143, 147 or control systems 146.

In embodiments the television receiver may include a monitoring and control module 140, 141 and may be directly connected or coupled to one or more sensors and/or control units. Sensors and control units may be wired or wirelessly coupled with the television receiver. The sensors and control units may be coupled and connected in a serial, parallel, star, hierarchical, and/or the like topologies and may communicate to the television receiver via one or more serial, bus, or wireless protocols and technologies which may include, for example, WiFi, CAN bus, Bluetooth, I2C bus, ZigBee, Z-Wave and/or the like.

The system may include one or more monitoring and control modules 140, 141 that are external to the television receiver 150, or may be part of the receiver 150. The television receiver may interface to sensors and control units via one or more of the monitoring and control modules. The external monitoring and control modules 140, 141 may be wired or wirelessly coupled with the television receiver. In some embodiments, the monitoring and control modules may connect to the television receiver via a communication port such as a USB port, serial port, and/or the like, or may connect to the television receiver via a wireless communication protocol such as Wi-Fi, Bluetooth, Z-Wave, ZigBee, and the like. The external monitoring and control modules may be a separate device that may be positioned near the television receiver or may be in a different location, remote from the television receiver.

In embodiments, the monitoring and control modules 140, 141 may provide protocol, communication, and interface support for each sensor and/or control unit of the system, and be operated, controlled, or sent instructions by the home automation engine 111. The monitoring and control module may receive and transmit readings and provide a low level interface for controlling and/or monitoring the sensors and/or control units. The readings processed by the monitoring and control modules 140, 141 may be used by the other elements of the television receiver. For example, in some embodiments the readings from the monitoring and control modules may be logged and analyzed by the data processing and storage 122 module. The data processing and storage 122 module may analyze the received data and generate control signals, schedules, and/or sequences for controlling the control units. Additionally, the data processing and storage module 122 may utilize input data to generate additional outputs. For example, the module 122 may receive from a sensor 142 information from a communicatively coupled piece of equipment. The sensor may be a part of or attached to the equipment in various embodiments. The equipment may provide information regarding movements, alarms, or notifications associated with the home, and the data processing module 122 may use this data to generate relative distance information to be output to and displayed by display device 160. In some embodiments, the monitoring and control modules 140, 141 may be configured to receive and/or send digital signals and commands to the sensors and control units. The monitoring and control modules may be configured to receive and/or send analog signals and commands to the sensors and control units.

Sensors and control units may be wired or wirelessly coupled to the monitoring and control modules 140, 141 or directly or indirectly coupled with the receiver 150 itself. The sensors and control units may be coupled and connected in a serial, parallel, star, hierarchical, and/or the like topologies and may communicate to the monitoring and control modules via one or more serial, bus, or wireless protocols and technologies. The sensors may include any number of temperature, humidity, sound, proximity, field, electromagnetic, magnetic sensors, cameras, infrared detectors, motion sensors, pressure sensors, smoke sensors, fire sensors, water sensors, and/or the like. The sensors may also be part of or attached to other pieces of equipment, such as exercise equipment or appliances, or may be applications or other sensors as part of mobile devices.

The monitoring and control modules 140, 141 may be coupled with one or more control units. The control units may include any number of switches, solenoids, solid state devices and/or the like for making noise, turning on/off electronics, heating and cooling elements, controlling appliances, HVAC systems, lights, and/or the like. For example, a control unit may be a device that plugs into an electrical outlet of a home. Other devices, such as an appliance, may be plugged into the device. The device may be controlled remotely to enable or disable electricity to flow to the appliance. A control unit may also be part of an appliance, heating or cooling system, and/or other electric or electronic device such as a piece of exercise equipment. In embodiments the control units of other systems may be controlled via a communication or control interface of the system. For example, the water heater temperature setting may be configurable and/or controlled via a communication interface of the water heater or home furnace. Additionally, received telephone calls may be answered or pushed to voicemail in embodiments.

The controllers, e.g. control 143, may include a remote control designed for association with the television receiver. For example, the receiver remote control device may be communicatively coupled with the television receiver, or one or more of the monitoring and control modules for providing control or instruction for operation of the various devices of the system. The control may be utilized to provide instructions to the receiver for providing various functions with the automation system.

At least some of these home automation devices may be used to monitor the security of the structure in which they are installed. Relevant data transmitted to the home automation host system may serve as a security alert, that is, information that is relevant to security of the structure. Security alerts may be gleaned from: door sensors, which may be used to determine when a door has been opened; lock controllers, which may be used to determine when a lock has been unlocked; smoke detectors, which may be used to determine when smoke is present; carbon monoxide detectors, which may be used to determine when carbon monoxide is present; home security systems, which may include one or more window monitors, door monitors, motion sensors, microphones, and/or cameras that are used to monitor for an intrusion, motion, and/or sound; pet door/feeders, which may monitor for the pet door being opened; cameras, which may monitor for motion or a person; window sensors, which may be used to determine if the window is opened; intercoms and/or dedicated microphones, which may be used to monitor for sounds through the structure; garage door controllers, which may be used to determine if a garage door is opened; and doorbell sensors, which may be used to determine if the doorbell is actuated. Other security related sensors also may be possible. All of the above information may be relevant to security, especially if received during a time when the user is typically sleeping, such as a user defined time period of 10 PM-5 AM; or a time when the user is determined to be sleeping, e.g., based on his location, the location of his mobile device, the state of lights within the structure and/or the room he is within, the user being determined to be in bed with the lights off, etc.

Additional forms of sensors not illustrated in FIG. 1 may also be incorporated as part of a home automation system. For instance, a mailbox sensor may be attached to a mailbox to determine when mail is present and/or has been picked up. The ability to control one or more showers, baths, and/or faucets from television receiver 150 and/or wireless devices 161 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 150 or wireless devices 161 when within range. For example, when a vehicle has been parked within range of a local wireless network with which television receiver 150 is connected, video and/or audio may be transmitted from the dashcam to the television receiver for storage and/or uploading to a remote server.

Sensors may be part of other devices and/or systems. For example, sensors may be part of a mobile device such as a phone. The telemetry readings of the sensors may be accessed through a wireless communication interface such as a Bluetooth connection from the phone. As another example, temperature sensors may be part of a heating and ventilation system of a home. The readings of the sensors may be accessed via a communication interface of the heating and ventilation system. Sensors and/or control units may be combined into assemblies or units with multiple sensing capabilities and/or control capabilities. A single module may include, for example a temperature sensor and humidity sensor. Another module may include a light sensor and power or control unit and so on.

In embodiments, the sensors and control units may be configurable or adjustable. In some cases the sensors and control units may be configurable or adjustable for specific applications. The sensors and control units may be adjustable by mechanical or manual means. In some cases the sensors and control units may be electronically adjustable from commands or instructions sent to the sensors or control units. For example, the focal length of a camera may be configurable in some embodiments. The focal length of a camera may be dependent on the application of the camera. In some embodiments the focal length may be manually set or adjusted by moving or rotating a lens. In some embodiments the focal length may be adjusted via commands that cause an actuator to move one or more lenses to change the focal length. In other embodiments, the sensitivity, response, position, spectrum and/or like of the sensors may be adjustable.

During operation of the system 100, readings from the sensors may be collected, stored, and/or analyzed in the television receiver 150. In embodiments, analysis of the sensors and control of the control units may be determined by configuration data 124 stored in the television receiver 150. The configuration data may define how the sensor data is collected, how often, what periods of time, what accuracy is required, and other characteristics. The configuration data may specify specific sensor and/or control unit settings for a monitoring and/or control application. The configuration data may define how the sensor readings are processed and/or analyzed. For example, for some applications, sensor analysis may include collecting sensor readings and performing time based analysis to determine trends, such as temperature fluctuations in a typical day or energy usage. Such trending information may be developed by the receiver into charts or graphs for display to the user. For other applications, sensor analysis may include monitoring sensor readings to determine if a threshold value of one or more sensors has been reached.

The function of the system may be determined by loading and/or identifying configuration data for an application. In embodiments, the system 100 may be configured for more than one monitoring or control operation by selecting or loading the appropriate configuration data. In some embodiments the same sensors and/or control units may be used for multiple applications depending on the configuration data used to process and analyze sensor readings and/or activate the control units. Multiple monitoring and/or control applications may be active simultaneously or in a time multiplexed manner using the same or similar set of sensors and/or control units.

For example, the system 100 may be configured for both exercise monitoring and temperature monitoring applications using the same set of sensors. In embodiments, both monitoring applications may be active simultaneously or in a time multiplexed manner depending on which configuration data is loaded. In both monitoring applications the same sensors, such as proximity sensors, or cameras may be used. Using the same sensors, the system may be configured for space temperature monitoring. For temperature monitoring the system may only monitor a specific subset of the sensors for activity. For temperature monitoring, sensor activity may not need to be saved or recorded. The sensor readings may be monitored for specific thresholds which may indicate a threshold temperature for adjusting the space temperature. In this example, the two different monitoring examples may be selected based on the active configuration data. When one configuration data is active, data from the sensors may be saved and analyzed for fitness monitoring. When the second configuration data is active, the system may monitor sensor readings for specific thresholds. Of course, multiple or alternative sensors may be used as well.

In embodiments the results, status, analysis, and configuration data details for each application may be communicated to a user. In embodiments auditory, visual, and tactile communication methods may be used. In some cases a display device 160 such as a television may be used for display and audio purposes. The display device may show information related to the monitoring and control application. Statistics, status, configuration data, and other elements may be shown. Users may also save particular configuration data for devices. A user may log in or be recognized by the system upon activation and the system may make adjustments based on predetermined or recorded configuration data. For example, a user may have instructed that when he is recognized by the system, either automatically or with provided login information, a notification suspension profile personal to the user be enacted. That profile may include that the user would like to continue to receive alarms, such as smoke, fire, or hazard alarms, but that received telephone call information is suspended. The user may access the profile and select to begin, the user may be recognized by the system, or a combination such as being recognized by the system such that the television operations are performed or are input by a remote control, while the user himself selects a particular activity to perform with the system.

Any number of additional adjustments or operations may be performed as well, as would be understood as encompassed by the present technology. For example, the space temperature may be monitored or adjusted as well. In one situation, after the user has been exercising for a period of time, generated heat may raise the space temperature above a threshold such that the home automation engine 111 additionally begins operation or adjustment of the HVAC system to cool the space. Additionally, configuration data for the user may include reducing the space temperature to a particular degree based on a preference of the user. Thus, when the user loads a profile or begins exercising, the home automation system may automatically begin adjusting the space temperature as well in anticipation of heat generation or user preferences.

In embodiments the system may include additional notification and display devices or wireless devices 161 capable of notifying the user, showing the status, configuration data, and/or the like. The additional notification and display devices may be devices that are directly or indirectly connected with the television receiver, and may be configured to provide commands to the television receiver for operating the home automation system. In some embodiments computers, mobile devices, wall panels, phones, tablets, communicatively coupled equipment, and the like may receive information, notifications, control signals, etc., from the television receiver. Data related to the monitoring and control applications and activity may be transmitted to remote devices and displayed to a user. Such display devices may be used for presenting to the user interfaces that may be used to further configure or change configuration data for each application. An interface may include one or more options, selection tools, navigation tools for modifying the configuration data which in turn may change monitoring and/or control activity of an application. Modification to a configuration may be used to adjust general parameters of a monitoring application to specific constraints or characteristics of a home, user's schedule, control units, and/or the like.

Display interfaces may be used to select and/or download new configurations for monitoring and/or control applications. A catalog of pre-defined configuration data definitions for monitoring and control applications may be available to a user. A user may select, load, and/or install the applications on the television receiver by making a selection using in part the display device. For example, a user may load a profile based on locking doors and unlocking windows throughout the home upon returning home in the evening. In embodiments, configuration data may be a separate executable application, code, package, and/or the like. In some cases, the configuration data may be a set of parameters that define computations, schedules, options, etc., for other processor executable code or instructions. Configuration data may be metadata, text data, binary file, and/or the like.

In embodiments notification and display devices may be configured to receive periodic, scheduled, or continuous updates for one or more monitoring and control applications. The notifications may be configured to generate pop-up screens, notification banners, sounds, and/or other visual, auditory, and/or tactile alerts. In the case where the display device is a television, some notifications may be configured to cause a pop-up or banner to appear over the programming or content being displayed, such as when a proximity monitor has been triggered in the home. Such an alert may be presented in a centrally located box or in another position to make it more recognizable. Additionally the program being watched can be paused automatically while such an alert is being presented, and may not be resumed unless receiving an input or acceptance from the user. Some notifications may be configured to cause the television to turn on if it is powered off or in stand-by mode and display relevant information for a user. In this way, users can be warned of activity occurring elsewhere in the system.

The television receiver may also be configured to receive broadcast or other input 162, including broadcasted multimedia content. Such input may include television channels or other information previously described that is used in conjunction with the monitoring system to produce customizable outputs. For example, a user may wish to watch a particular television channel while also receiving video information of activities occurring on the property. The television receiver may receive both the exterior camera information and television channel information to develop a modified output for display. The display may include a split screen in some way, a banner, an overlay, etc.

Figure 2:
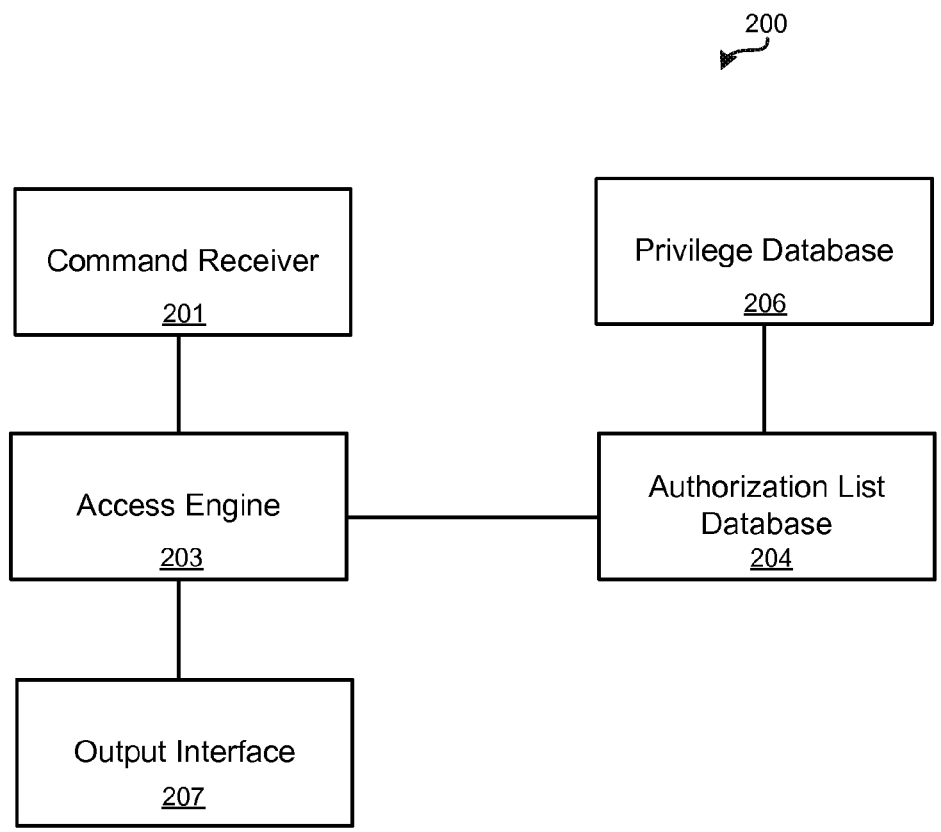
FIG. 2 illustrates modules of an exemplary electronic device that may be used in accordance with embodiments of the present technology.

FIG. 2 illustrates an embodiment 200 of components of a home automation host system that can perform various actions in response to receiving a user command. Such components may be incorporated as part of a television receiver, wireless device, or some other form of device that functions as a home automation host system. The home automation host system may include: home automation command receiver 201, access engine 203, authorization list database 204, privilege database 206, and output interface 207. The components of embodiment 200 may be implemented using specially-purposed hardware, firmware, and/or software executed by underlying hardware.

Command receiver 201 may serve to periodically receive home automation system commands from users via one or more devices. For example, a user may enter a command via a mobile device that is communicatively coupled with the command receiver, or may provide a command directly to the receiver, or via a home control module communicatively coupled with the command receiver. Additionally, a user may provide a command via a device otherwise coupled to the system, such as by physically operating a lock or attempting to operate a lock. The home automation host system may then determine whether to allow access to the user to perform the command.

Access engine 203 may analyze data received by home automation command receiver 201 from various home automation security devices. Access engine 203 may determine if access should be granted or denied for the particular command or to the particular user. Such a determination may be based on the content of the data and/or commands received by home automation command receiver 201 and by comparing the received data to determination values, criteria, or other forms of stored values in authorization list database 204. Authorization list database 204 may contain a set of commands, which may include all available home automation system commands, and each command may be associated with one or more criteria for providing access such that the command may be performed by the home automation system. Access engine 203 may also utilize privilege values stored in privilege database 205 to determine the privilege of the user providing the command for use in determining whether access should be granted. By comparing the received command from a user to the authorization criteria and privilege data stored in the system, access engine 203 may determine whether to grant access in the form of processing or performing the given command.

Output interface 207 may receive an indication of a defined response to be output. Output interface 207 may cause the content of the defined response forwarded by access engine 203 to be implemented. For instance, this may include output interface 207 interfacing with one or more telecommunication networks and/or communicating with one or more home automation devices present within the structure, e.g., to turn on a light or unlock a door. Output interface 207 may also communicate directly with the device by which the user command was received in order to request more information, such as a password, or provide an explanation as to why access is being denied.

Figure 3:
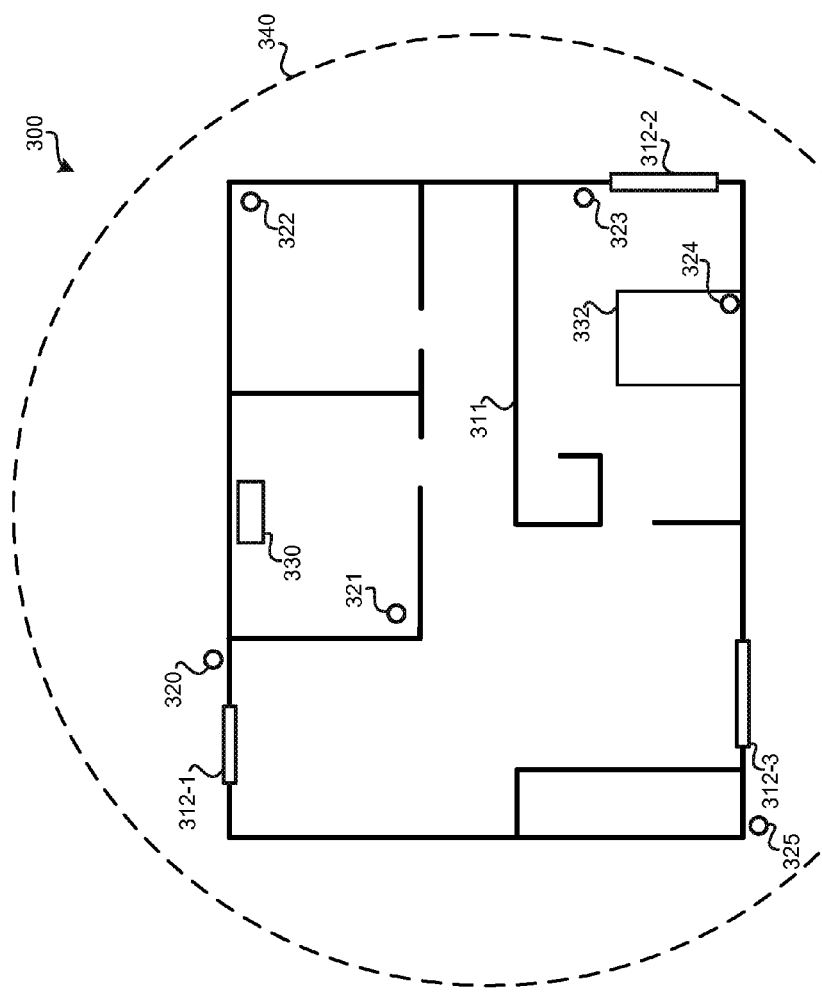
FIG. 3 illustrates an exemplary home floorplan associated with a home automation system in accordance with embodiments of the present technology.

FIG. 3 illustrates an embodiment of a floor plan 300 of a structure having an installed home automation system. Present on floor plan 300 are doors 312, walls, such as wall 311 (only one wall labeled for simplicity), and bed 332. Also present are home automation devices 320, 321, 322, 323, 324, and 325. In embodiments, these may include motion detectors, sound sensors, lights, appliances, etc., as previously described. As an example, home automation device 320 may be a motion detector or security light along the exterior of the home. Information that can serve as a security alert may be transmitted by home automation device 320 to home automation host system 330 when motion is detected. Such information may only be transmitted during particular times, such as during the night, when motion in the vicinity of door 312-1 is potentially suspicious. Home automation device 325 may be a camera, possibly with an on-board microphone. When video is captured that includes motion or sound above a certain threshold volume, information that may serve as a security alert may be transmitted to home automation host system 330. Similar information that can serve as a security alert may be transmitted to home automation host system 330 by home automation devices 322, 323, and 324. Additionally, home automation devices 322, 323, 324, etc., may be mobile devices of users associated with the system, such as people living in the home, as well as control panels for accessing the system. For example, home automation device 323 may be a control panel that may provide commands or control operations for the home automation system.

Instructions or commands may be provided from a variety of the home automation devices to the home automation host system 330, which may be a television receiver in embodiments. For example, home automation device 324 may be a mobile phone of a user that includes software or an application for accessing the home automation system, and providing commands. Such a device may be communicatively coupled with the home automation system through a wireless communication system, such as Wi-Fi, in embodiments. Utilizing a wireless system, unlike a wired controller or remote specific to the home automation host system 330, a wireless system may provide access both within the home and within a radius outside the home 340. Accordingly, the system may not be able to confirm whether the user providing the command is directly within the home or outside. As will be explained below, because of this possible security issue, heightened scrutiny may be required of the user, such as additional verification or passcodes, or limited commands may be approved by the system for that user.

Figure 4:
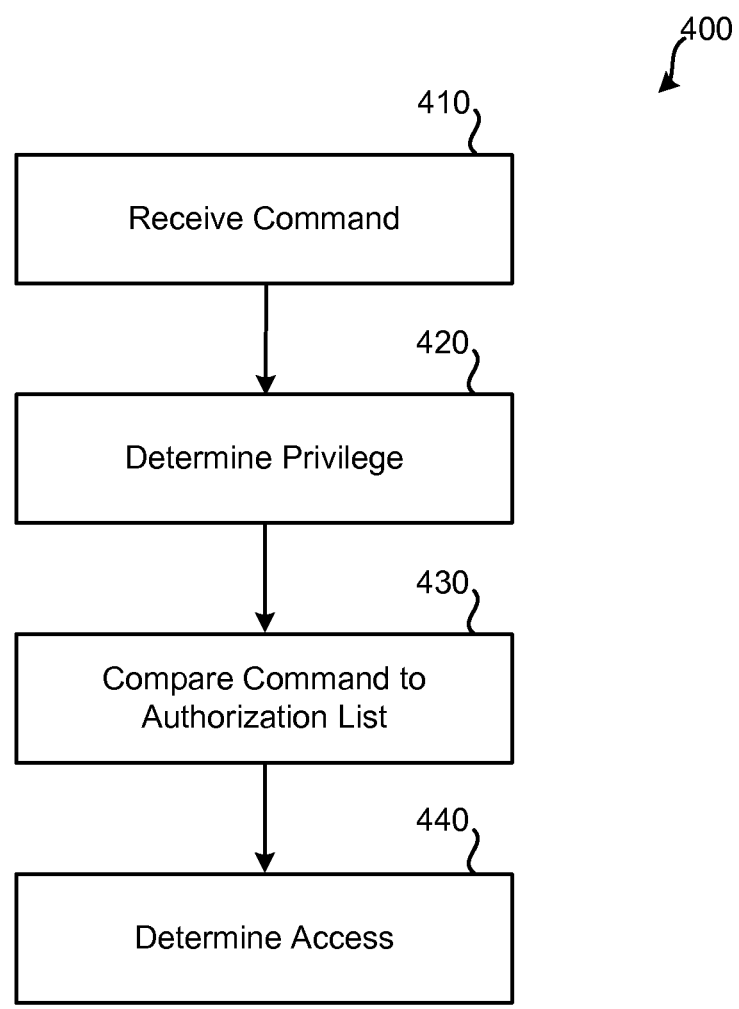
FIG. 4 shows a simplified flow diagram of a method of determining access for a home automation system according to embodiments of the present technology.

The systems and devices previously described may be used in performing various methods. The methods may also be represented by programming stored in memory of a computing device. FIG. 4 illustrates an embodiment of a method 400 for determining access for a home automation system of a home. Method 400 may be performed using any of the systems or components previously described. Method 400 may allow for an electronic device to receive commands for performing functions related to the home automation system, and determine whether to allow the user access to the system in the form of performing the command. Each step of method 400 may be performed at or by a single electronic device, such as an STB, television receiver, computer, or mobile device, for example, or by multiple devices communicating with one another. Means for performing each step of method 400 include an electronic device and/or the various components of an electronic device or distribution system, such as those detailed in relation to FIGS. 1 and 2. Method 400 may be performed using a computerized device, such as a device incorporating some or all of the components of computer system 600 of FIG. 6.

The method may include receiving a command from a user to perform a home automation function at operation 410. The command may include a command to operate any controllable function of the home automation system. Some non-limiting examples may include a command to lock or unlock a door, turn on a light, operate a system including a heating/cooling system, open or close the garage, operate a camera, turn on or off sensors, etc. When the command is received, the method may include determining a privilege for the user at operation 420. The privilege of the user may be determined in a number of ways that will be explained in more detail below, but may include accessing a privilege database that identifies the user or device and has a privilege assigned to the user or device. The method may also include comparing the received command and the user privilege to an authorization list at operation 430. The authorization list may be stored in memory, such as in memory of the home automation host system 330 described above, for example. The authorization list may define system access for performing commands, and the access may be based at least on individual commands and associated privileges in embodiments. In response to the comparison, the method may include determining whether to allow the user to access the home automation system to perform the commanded home automation function at operation 440. Access may be granted in the form of performing the received command.

In embodiments the method may optionally further include determining whether the command is a security function for the home automation system. For example, many commands utilized with a home automation system may not be related to system security. For example, operating a pet feeder, turning on or off a light, etc., may not be operations for which privilege is required, and thus the system may directly perform such operations defined as non-security related in embodiments. Such a designation may be factory preset, or identified by a master user of the system, such as during system set-up, for example. Other operations, however, may be determined security operations, and may utilize the described method. For instance, any operation that may impact the integrity of the home may be characterized as a security operation. For example, locking or unlocking windows or doors, arming or disarming sensors, etc., may directly affect the home security, and thus may be characterized as security functions. In embodiments, some commands may be related to security, but may be determined or set to be non-security functions in embodiments. For example, operating or monitoring cameras in the home may be technically security related, but may be set by a user to be non-security functions, and thus may not require scrutiny when performed. However, such operations may be security related, and thus be performed according to the method in embodiments as well.

Determining a privilege for the user attempting to perform the received command may include determining the identity of the user in embodiments. For example, a user utilizing a device accessible by several users may not be recognized without further interaction, and if different users have different privileges, the system may identify the user to determine the privilege. For example, determining the identity of the user may include receiving an appropriate user access code from the user. In embodiments, other recognition techniques may be used including voice or facial recognition, biometric scan, etc. Such a process may or may not occur with personalized user devices such as mobile phones, for example. Depending on the command, by recognizing the device, the system may be able to appropriately identify the user and determine the privilege. In other embodiments, however, the system may require an additional code or identification even on personalized devices to ensure adequate security based on the command received.

Determining the privilege of the user may include determining the location of the user in embodiments. For example, the determination may include determining whether the user is in the home or outside the home. A user can be determined to be inside the home in a number of ways including how the command was received. For example, if the command was received at the home automation host system, such as a central operation device or the television receiver described previously, utilizing the remote specifically defined for that device, the system may determine that the user is in the home due to proximity of the remote, for example. Additionally, the command may be received at an internal controller, such as a wall mounted control panel, which may only be accessed from inside the home.

Additionally, the host system may provide an internal network, such as a local wireless network accessible at the home. Such a network may include password protection, such as WPS network security, which may only allow access by devices associated with users who live in the home, for example. Accordingly, even though a device, such as a user mobile device, may not be directly coupled with the system, because it is providing the command via a protected network, the user may be determined to be in the home. By determining that a user is in the home, the user may be provided enhanced privileges, and be allowed to request security functions or a broader array of security functions. For example, a user who is in the home may be authorized to unlock windows of the home, for example, while a user who is determined to not be in the home, such as by utilizing a cellular or LTE network, may not be provided such privileges and may be prevented from accessing the home automation system security functions. Other technology may be utilized in lieu of or in addition to these technologies. For example, cameras within the home may be able to recognize a user via some recognition feature, and thus may be able to verify that a user is in the home. Additionally, GPS functionality of a user device may further verify a user position as within the home. Any other technology able to verify or aid in verifying a user position may similarly be employed and is encompassed by the present technology.

A determination that the user providing the command is on an internal network, but not necessarily in the home, may provide access to a more limited set of commands on the authorization list than a determination that the user is at a central operation device, or unquestionably within the home in embodiments. For example, as explained above, a user may be utilizing a wireless network that has a zone similar to zone 340 described above. Even with password protection to access the network, a device may be on the network but not within the home. For example, a family member who has a device associated with the home automation system may be outside the home but on the property and within the coverage of the wireless network. The user may go indoors but leave the mobile device outside inadvertently. If someone other than the user found the phone, the person may be able to access the home by simply requesting the front door be unlocked. Accordingly, reduced functionality may be provided to a device associated with the system, but that may be outside the home. Additionally, enhanced security may be required of the device to receive greater functionality whether in the home or not. For example, additional passcodes or recognition may be provided to ensure that it is the user attempting to access the home via the home automation system.

The authorization list may include a set of associations for every command available in the home automation system. In determining a privilege of a user, the system may determine whether the user is within the home. If the system determines that the user is not in the home, the system may access the authorization list with the received command and privilege or location determination to determine whether access is to be granted. In analyzing the authorization list and performing the comparison operation, the system may determine that the received command requires the user to be in the home to process the command. In response to such a comparison, the home automation system may deny or prevent access to the system, by preventing the operation or performance of the command. For example, if a user who is determined to be outside the home requests a window to be unlocked, the system may determine by the comparison that unlocking windows may only be performed by users inside the home. Accordingly, the system may not perform the operation associated with the command, i.e. unlocking the window, and may or may not provide a response to the device from which the command was received. For example, the system may send a message to the device indicating that such an operation requires the user to be in the home. Additionally, the system may notify other users of the system that an unauthorized command was received and denied, such that the additional user may determine whether to follow up, call the authorities, etc. The system may also in response to the denial request an additional access or override code in order to perform the operation, which may be provided by the user. Should the user be under duress, the system may be configured to accept a panic code, which performs the command while simultaneously contacting the authorities and indicating that criminal activity may be underway.

In embodiments, the authorization list may include all available home automation system commands, and may define access for performing each command based on a privilege associated with the device from which the command is received. For example, each device may be provided a privilege setting or level. Different devices, based on their likelihood of being compromised, may be afforded different privileges or command functionality. The host controller, such as the television receiver for example, may have the highest level of privileges as it may only be operated in the home for which it was configured. The device may require access codes or other verifications to be provided in order to perform certain functions, but may be capable of performing any and all commands available to the home automation system. For example, one command may be to modify privileges or commands associated with the system, and such modification may be performed by only a single user of the system. Accordingly, a master access code may be required at the device itself in order to access the authorization list for modification. The host controller, such as a television receiver, may have a remote control dedicated to the host controller, and access to the authorization list may only be allowed via entry of a particular access code with the dedicated remote control.

Other controllers that are fixed in the home, such as wall-mounted panels, etc., may have slightly lower privilege settings than the host controller, but may be capable of performing most commands without other scrutiny. For example, wall-mounted controllers may be configured for performing any command received directly at the panel except for adjusting system settings like modifying the authorization list, or some other level of ability for performing commands. Additionally, if certain commands require user identification, these controllers may require the user to identify himself in one way or another before access is granted in the form of performing the received command. Mobile controllers, such as individual tablets or user mobile phones may have similar or lower privileges than other controllers. For example, mobile devices may have similar privileges for performing commands, but may require additional user scrutiny such as authentication via passcode before performing the command. In embodiments, the mobile devices may have reduced privileges such that certain commands may not be performed by mobile devices in order to maintain security of the home. Additionally, mobile devices may have different privilege levels based on their location. For example, a mobile device determined to be within the home may have a higher privilege than a mobile device determined to be on an external network, or at a great distance from the home.

The available home automation system commands may also include commands having directionality, such as a command to lock a door, and another command to unlock the door. In embodiments, one direction of at least one command may include access by any user with any privilege, and another direction of the at least one command may have access restricted to a subset of users or privileges. This may apply to many commands in embodiments of the technology. For example, the system may be easily accessible for securing the house, but less accessible for entry. A command to lock the front door may be performed by any device in embodiments without any further requirements or limitations, while a command to unlock the front door may require additional scrutiny, such as identification of the user or whether the user is in proximity of the home. Similarly a command to close the garage door, lock windows, lock doors, etc., may be performed by any device no matter the location in order to ensure home security. Accordingly, even if the system identifies the device as being miles away from the home, the system may authorize access for a command to lock the front door. However, a similarly identified device may be prevented from unlocking the front door in embodiments, because the device is not in proximity to the door.

In embodiments the authorization list may further define access by time of day. Accordingly, one or more devices may have privileges adjusted throughout the day. For example, a mobile device may be authorized to issue commands to unlock the front door during daytime hours, but may not have privilege to unlock the front door after 10:00 PM or midnight, for example. Additionally, privileges may be adjusted throughout the day, such that, for example, a device may be authorized to unlock the front door during the day, but must be identified inside the house, or must provide additional verification or identification to unlock the front door after a certain hour of the day, such as in the evening, at night, or at any particular hour before or after 6:00 PM and before or after 6:00 AM, for example. Users of the system may define at what hours such functionality or privileges are adjusted in embodiments of the technology as well to suit individual family or business needs. Also in embodiments during at least one time of day, access to any security function may be restricted to a user determined to be in the home. Such an embodiment may be associated with nighttime functionality where a family is sure that all members are inside the home.

In additional embodiments, if it is at off-hours or after pre-set evening hours, a mobile device may require authorization from another device of the system before being granted access to perform a command. For example, if a device, such as a user mobile phone, does not have privilege to unlock the front door after 9:00 PM, if the mobile device attempts such a command, the system may query an additional device of the system. For example, the system may send a request to another user's mobile device requesting whether access should be granted to perform the command. The system may provide video surveillance, a picture taken from a security camera or other information that may be used by the other user to verify the identity of the user attempting to perform the command. Additionally, if a user is watching television during such an event, the system may prompt the user via the display whether to grant access for performing certain commands, and may provide video or other information for use by the user in making such a determination.

Such technology may also be utilized as a form of parental control on the system. For example, after a certain time, such as in the evening or after a preset bedtime, if a command is received by the system from a user device associated with a child, the system may send a prompt to a device associated with a parent, or to the host controller for authorization. For example, if the host controller is located in a parent's bedroom, or if an associated controller is located thusly, the prompt may be sent there as well. Such prompts may be sent for other notifications as well, including access to an appliance, such as a refrigerator, or other rooms or locations of the house, as well as access to opening windows, etc.

The command received may be a physical command in embodiments, such as a physical attempt to unlock a window, or use of a key to open a door. In embodiments of these types of commands, determination of the privilege may include a determination of whether the command is received from inside the home. For example, if a family may verify that all members are inside the home and have been accounted, the system may be set to prevent any external entry into the home. Accordingly, even if a person was able to acquire a key to a door, the door may be prevented from being unlocked by the system. For example, the door may utilize magnetic or electronic locks, or may include a latch controlled by the home automation system such that use of the key is prevented unless the system authorizes access via the key. In embodiments such an attempt may have the system send a prompt, warning, or notice to one or more additional users of the system to determine whether access should be granted. The system may also be able to identify whether the command is received from inside the home or outside the home. For example, a door lock may have a bolt on the interior side of the lock, and require a key on the exterior. Accordingly, the system may be able to recognize, via software, sensors, entry of a key, etc., whether a door is being opened from the inside or outside, and allow the physical command to occur from one direction but not the other, such as at night when the entire family is known to be indoors.

Turning to FIG. 5 is shown an exemplary authorization list 500 according to embodiments of the present technology. FIG. 5 is only an example, and it is to be understood that alternate configurations are similarly encompassed by the present technology. Authorization list 500 may include a list of commands 505 associated with the home automation system, and may include all possible commands associated with the system. Although not specified, ellipses 510 are intended to convey that many more or alternate commands may be included in the authorization list. The authorization list may include a set of privileges as previously discussed, or may be associated with an additional database or list identifying privileges. Although listed as a separate level based scheme, it is to be understood that the privilege may be based on user, location, time, or any other scheme discussed or encompassed by the present technology.

The example illustrated includes a specific privilege scheme that may be based on device, but may still require additional scrutiny based on time, location, user, etc. Ellipses 515 are intended to convey that any additional or alternative criteria may also be included in the authorization list. Although listed as levels, it is to be understood that any of a variety of privilege schemes are encompassed by the present technology. In the example illustrated, privilege is based on device, and each device is provided a particular privilege level. Privilege may also be based on passwords such that a user having a master passcode may have a high level of privilege regardless of what device is being used to provide a command. Each command is associated with a base-level privilege required for access to or performance of the command. For example, the host controller may be a device provided privilege Level 1, and is capable of performing any and all commands associated with the home automation system. Privilege Level 2 may be associated with devices fixed internally to the home, or mobile devices determined to be within the home, such as by additional verification. Such devices may be able to perform a subset of functions of the system, but not all commands unlike a device or devices having privilege Level 1. Privilege Level 3 may include mobile devices exterior to the home, or access via a network external to the home, such as by a desktop computer at work, and may have access to a limited number of commands in embodiments. Any number of Levels of privilege may be associated with the system and devices, and a base level privilege may be associated with system locking or shutdown, such that any device associated with the system or accessing the home automation system may perform the command without any further scrutiny, such as closing a garage door or locking windows or doors as described previously. It is to be understood that any number or modifications or alternate schemes may be used that are encompassed by the present technology.

Figure 6:
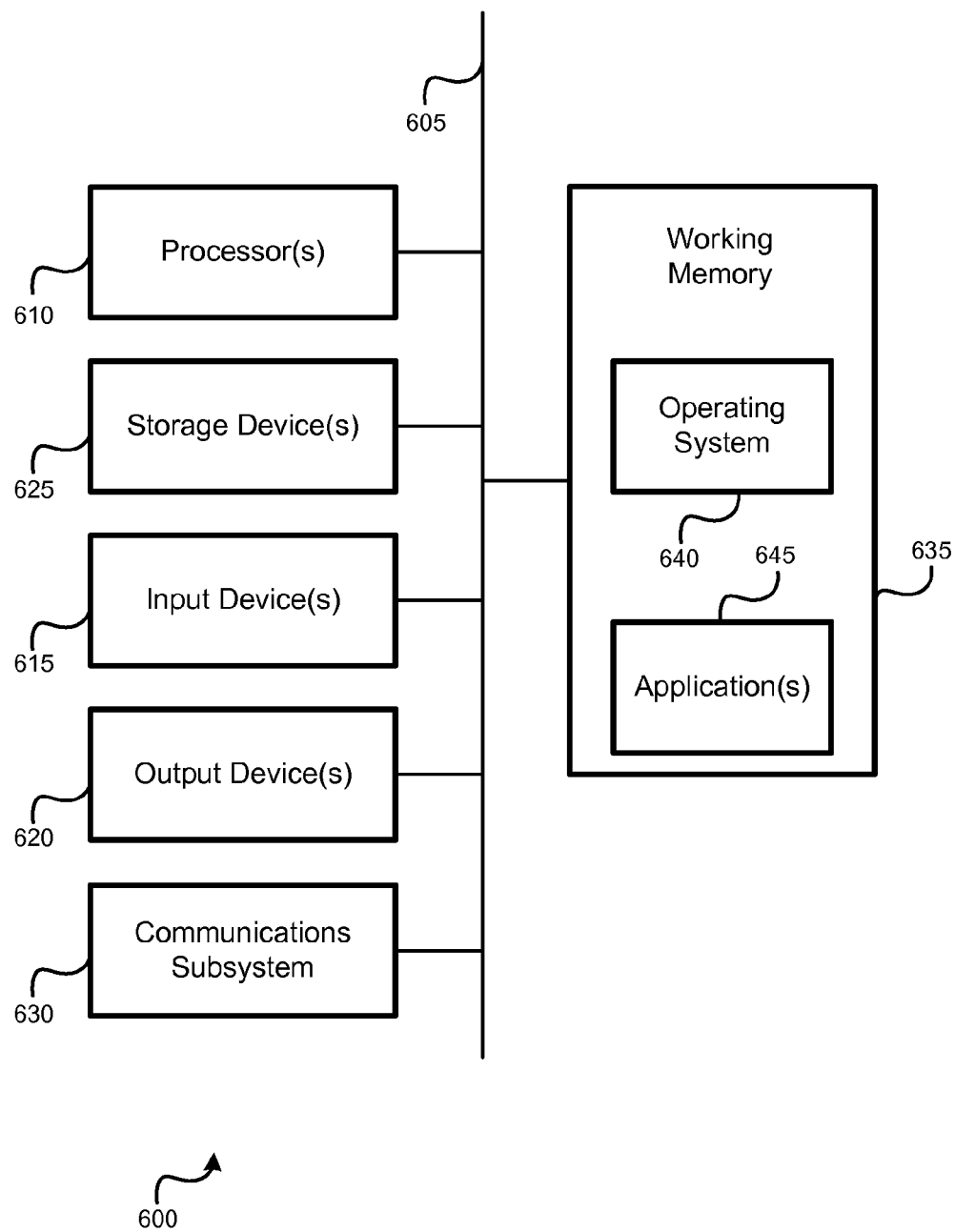
FIG. 6 shows a simplified computer system that may be utilized to perform one or more of the operations discussed.

FIG. 6 illustrates an embodiment of a computer system 600. A computer system 600 as illustrated in FIG. 6 may be incorporated into devices such as an STB, a first electronic device, DVR, television, media system, personal computer, and the like. Moreover, some or all of the components of the computer system 600 may also be incorporated into a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device or STB, as an input device 615. In many embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/ or may be designed to implement methods, and/or configure systems, provided by other embodiments, as described herein. Merely by way of example, one or more procedures described with respect to the methods discussed above, such as those described in relation to FIG. 4, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/ code to processor(s) 610 for execution and/or might be used to store and/or carry such instructions/code. In many implementations, a computer-readable medium is a physical and/ or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, wellknown circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of determining access for a home automation system of a home, the method comprising:

receiving a command from a user to perform a home automation function at a device associated with the home automation system of a home, the home automation function to cause operation of a home automation device, where the home automation device is configured to operate in at least a first direction and a second direction;

detecting whether the device associated with the home automation system is inside the home or outside the home at a time the command is received;

determining a privilege for the user based at least in part on receiving a user access code and the detecting of whether the device associated with the home automation system is being accessed by the user inside the home or outside the home at the time the command is received;

comparing the command and the privilege to an authorization list, wherein the authorization list defines system access to perform home automation functions restricted based at least in part on i) time of day, ii) device location inside the home or outside the home, and iii) directionality of the home automation functions, wherein the authorization list includes all individual commands specified for reception by the home automation system and associated privileges required to perform each individual command;

determining whether to allow the user access to the home automation system to perform the commanded home automation function based at least in part on i) the time at which the command is received, ii) the determination of whether the device associated with the home automation system is inside the home or outside the home, and iii) whether the commanded home automation function is to cause the home automation device to operate in the first direction or the second direction;

issuing a first command to cause the commanded home automation function when the commanded home automation function is to cause operation of the home automation device in the first direction and the user access to perform the commanded home automation function is allowed in the first direction; and issuing a second command to cause transmission of a notification when the commanded home automation function is to cause operation of the home automation device in the second direction and the user access is not allowed in the second direction, identifying the user with a facial recognition by a camera associated with the home automation system, and sending an image from the camera associated with the home automation system to a second device associated with a second user to request verification from the second user of the identity of the user providing the command, wherein the transmission comprises the image.

2. The method of claim 1, further comprising determining whether the command comprises a security function for the home automation system.

3. The method of claim 1, wherein the detecting whether the device is inside the home comprises a determination that the command was received at a central operation device, at an internal controller, or on an internal network.

4. The method of claim 3, further comprising providing access to a more limited set of commands on the authorization list, when the determination is that the command was received on the internal network, than when the determination is that the command was received is at the central operation device.

5. The method of claim 1, wherein the individual commands specified for reception by the home automation system comprise commands having directionality, wherein one direction of at least one command comprises access by any user with any privilege, and wherein another direction of the at least one command comprises access restricted to a subset of users or privileges.

6. The method of claim 1, wherein the authorization list further defines access by time of day.

7. The method of claim 6, wherein during at least one time of day, access to any security functions is restricted to a user determined to be in the home.

8. The method of claim 1, wherein the command received comprises a physical command.

9. The method of claim 1, wherein the determining that the device is outside the home causes a determination of the privilege for the user that allows a reduced number of individual commands that may be performed by the user.

10. An electronic device comprising:
an input component configured to receive user commands;
at least one output component communicatively coupled with at least one display device;
one or more processors; and
memory communicatively coupled with and readable by the one or more processors and having stored thereon processor-readable instructions, which cause the one or more processors to:
receive a command from a user to perform a home automation function at a device associated with a home automation system of a home, the home automation function to cause operation of a home automation device, where the home automation device is configured to operate in at least a first direction and a second direction;
detect whether the device associated with the home automation system is inside the home or outside the home at a time the command is received;
determine a privilege for the user based at least in part on receiving a user access code and the detecting of whether the device associated with the home automation system is being accessed by the user inside the home or outside the home at the time the command is received;
compare the command and the privilege to an authorization list, wherein the authorization list defines system access to perform home automation functions restricted based at least in part on i) time of day, ii) device location inside the home or outside the home, and iii) directionality of the home automation functions, wherein the authorization list includes all individual commands specified for reception by the home automation system and associated privileges required to perform each individual command;
determine whether to allow the user access to the home automation system to perform the commanded home automation function based at least in part on i) the time at which the command is received, ii) the determination of whether the device associated with the home automation system is inside the home or outside the home, and iii) whether the commanded home automation function is to cause the home automation device to operate in the first direction or the second direction;
issue a first command to cause the commanded home automation function when the commanded home automation function is to cause operation of the home automation device in the first direction and the user access to perform the commanded home automation function is allowed in the first direction; and
issue a second command to cause transmission of a notification when the commanded home automation function is to cause operation of the home automation device in the second direction and the user access is not allowed in the second direction, identifying the user with a facial recognition by a camera associated with the home automation system, and sending an image from the camera associated with the home automation system to a second device associated with a second user to request verification from the second user of the identity of the user providing the command, wherein the transmission comprises the image.

11. The electronic device of claim 10, wherein the electronic device comprises a television receiver.

12. The electronic device of claim 10, wherein the electronic device further comprises a remote control specific to the device, and wherein access to the authorization list is available only by an access code received at the electronic device via the remote control.

13. A non-transitory, computer-readable medium having stored thereon processor-readable instructions, which, when executed by one or more processors, cause the one or more processors to:
receive a command from a user to perform a home automation function at a device associated with a home automation system of a home, the home automation function to cause operation of a home automation device, where the home automation device is configured to operate in at least a first direction and a second direction;
detect whether the device associated with the home automation system is inside the home or outside the home at a time the command is received;
determine a privilege for the user based at least in part on receiving a user access code and the detecting of whether the device associated with the home automation system is being accessed by the user inside the home or outside the home at the time the command is received;

compare the command and the privilege to an authorization list, wherein the authorization list defines system access to perform home automation functions restricted based at least in part on i) time of day, ii) device location inside the home or outside the home, and iii) directionality of the home automation functions, wherein the authorization list includes all individual commands specified for reception by the home automation system and associated privileges required to perform each individual command;

determine whether to allow the user access to the home automation system to perform the commanded home automation function based at least in part on i) the time at which the command is received, ii) the determination of whether the device associated with the home automation system is inside the home or outside the home, and iii) whether the commanded home automation function is to cause the home automation device to operate in the first direction or the second direction;

issue a first command to cause the commanded home automation function when the commanded home automation function is to cause operation of the home automation device in the first direction and the user access to perform the commanded home automation function is allowed in the first direction; and issue a second command to cause transmission of a notification when the commanded home automation function is to cause operation of the home automation device in the second direction and the user access is not allowed in the second direction, identifying the user with a facial recognition by a camera associated with the home automation system, and sending an image from the camera associated with the home automation system to a second device associated with a second user to request verification from the second user of the identity of the user providing the command, wherein the transmission comprises the image.

14. The non-transitory, computer-readable medium of claim 13, wherein the detecting comprises a determination that the command was received at a central operation device, at an internal controller, or on an internal network.

* * * * *